United States Patent
Høeg et al.

(10) Patent No.: US 11,346,222 B2
(45) Date of Patent: May 31, 2022

(54) ROTARY SLIDING VANE MACHINE WITH HYDROSTATIC SLIDE BEARINGS FOR THE VANES

(71) Applicant: TOCIRCLE INDUSTRIES AS, Oslo (NO)

(72) Inventors: Arne Høeg, Hvalstad (NO); Kristian Aase Løver, Haslum (NO)

(73) Assignee: TOCIRCLE INDUSTRIES AS, Oslo (NO)

( * ) Notice: Subject to any disclaimer, the term of this patent is extended or adjusted under 35 U.S.C. 154(b) by 142 days.

(21) Appl. No.: 16/959,442

(22) PCT Filed: Dec. 18, 2018

(86) PCT No.: PCT/NO2018/050315
§ 371 (c)(1),
(2) Date: Jul. 1, 2020

(87) PCT Pub. No.: WO2019/139484
PCT Pub. Date: Jul. 18, 2019

(65) Prior Publication Data
US 2020/0370552 A1    Nov. 26, 2020

(30) Foreign Application Priority Data
Jan. 11, 2018   (NO) .................................. 20180046

(51) Int. Cl.
*F01C 21/08*     (2006.01)
*F04C 15/00*     (2006.01)
(Continued)

(52) U.S. Cl.
CPC .......... *F01C 21/0809* (2013.01); *F01C 1/344* (2013.01); *F01C 21/0818* (2013.01);
(Continued)

(58) Field of Classification Search
CPC .. F01C 1/344; F01C 21/0836; F01C 21/0809; F01C 21/0818; F04C 15/0088;
(Continued)

(56) References Cited

U.S. PATENT DOCUMENTS

| | | | |
|---|---|---|---|
| 2,044,873 A * | 6/1936 | Beust | F01C 21/0836 418/132 |
| 3,869,231 A | 3/1975 | Adams | |

(Continued)

FOREIGN PATENT DOCUMENTS

| | | |
|---|---|---|
| WO | 9842967 | 10/1998 |
| WO | 2007032703 | 3/2007 |
| WO | 2014024517 | 2/2014 |

OTHER PUBLICATIONS

International Search Report issued in PCT/NO2018/050315, dated Nov. 3, 2019, pp. 1-3.
(Continued)

*Primary Examiner* — Mary Davis
(74) *Attorney, Agent, or Firm* — Jeffrey S. Melcher; Melcher Patent Law PLLC

(57) ABSTRACT

The invention relates to a rotary sliding vane machine (1) for fluid processing, comprising a housing (2) with a cavity (4) with a rotor (9). Vanes (12) are arranged in outwardly directed slots (13) in the rotor (9), and relative sliding between the vanes and the rotor provides spaces with variable volumes in the rotational direction. Each vane is supported by hydrostatic slide bearings (20, 20') on each side of the vane (12). Due to pressure changes of the process fluid, the vane (12) is tilted towards and away from bearing pads (27, 27', 87). The invention causes the bearing pads to adjust their position to the vane (12), and also causes a change of volume of a bearing fluid chamber (21, 21', 81), which in turn effects a supply of bearing fluid to the slide bearing fluid film.

12 Claims, 8 Drawing Sheets

(51) Int. Cl.
*F01C 1/344* (2006.01)
*F04C 2/344* (2006.01)
*F04C 18/344* (2006.01)

(52) U.S. Cl.
CPC .......... *F01C 21/0836* (2013.01); *F04C 2/344* (2013.01); *F04C 15/0088* (2013.01); *F04C 18/344* (2013.01); *F04C 2240/54* (2013.01)

(58) Field of Classification Search
CPC ............... F04C 18/344; F04C 2240/50; F04C 2240/54; F16C 29/02; F16C 29/025; F16C 33/1005; F16C 33/105; F16C 32/0614; F16C 32/0666
See application file for complete search history.

(56) References Cited

U.S. PATENT DOCUMENTS

| | | | |
|---|---|---|---|
| 4,672,813 A | | 6/1987 | David |
| 4,692,104 A | | 9/1987 | Hansen |
| 5,996,355 A | * | 12/1999 | Jirnov ................. F01C 21/0809 62/87 |
| 2011/2000473 | | 8/2011 | Pekrul |
| 2020/0370553 A1 | * | 11/2020 | Hoeg ................. F01C 21/0809 |

OTHER PUBLICATIONS

Written Opinion issued in PCT/NO2018/050315, dated Aug. 3, 2019, pp. 1-3.
International Search Report issued in PCT/NO2018/050316, dated Dec. 3, 2019, pp. 1-3.
Written Opinion issued in PCT/NO2018/050316, dated Aug. 3, 2019, pp. 1-3.

* cited by examiner

ROTARY SLIDING VANE MACHINE WITH HYDROSTATIC SLIDE BEARINGS FOR THE VANES

The invention relates to a rotary sliding vane machine for fluid processing, comprising a housing with an internal wall forming a cavity with an inlet and outlet for process fluid; a rotor with a rotor axis in the cavity, a distance between an outer face of the rotor and the internal wall of the housing varies in the rotational direction; and vanes arranged in outwardly directed slots in the rotor, there is relative sliding between the vanes and the rotor during rotation, the vanes extend between the outer face of the rotor and the internal wall of the housing.

Closed spaces are defined between the vanes, the outer face of the rotor and the internal wall of the housing. Since the distance between the outer face of the rotor and the wall varies in the rotational direction, the volumes of the closed spaces also vary in the rotational direction. During operation, these spaces are filled with process fluid. The location and shape of the inlet and outlet are adapted to provide a flow of process fluid from the inlet to the outlet.

The variable distance between the outer face of the rotor and the internal wall of the housing can be achieved by both the cavity and the rotor being cylindrical, and the rotor eccentrically mounted in the cavity. Alternatively, the cavity may have other shapes, e.g. oval. The ends of the cavity are closed by end caps attached to the housing. The rotor and the vanes extend throughout the cavity in axial direction. Depending on requirements for the actual use of the rotary sliding vane machine, seals may be provided both at the outer edges of the vanes, at the sides of the vanes and at the sides of the rotor.

The rotor may be driven by an external driver. The rotor then drives the vanes, and the vanes move the process fluid. In this case, the rotary vane machine works as a pump if the process fluid is a liquid, and as a compressor if the process fluid is a gas or 2-phase, i.e. a mixture of liquid and gas. In other uses, the process fluid may drive the vanes and thereby the rotor, which can do external work. In this case, the rotary vane machine works as a hydromotor if the process fluid is a liquid, and as an expander if the process fluid is a gas or 2-phase.

U.S. Pat. No. 3,130,673 A describes a rotary vane pump in which the vanes slide freely in their slots, and thereby during rotation bear against the internal wall of the rotor due to the centrifugal force. In addition, the pressure in the pump acts on the inner side of the vanes and force them against the internal wall.

GB190621345A describes a rotary vane pump with a casing with a cylindrical cavity and two vanes independently rotatable about a spindle centrically located in the cavity. The vanes have a length equal to the internal radius of the cavity. A driven rotor with a cylindrical wall is eccentrically located in the casing, with the spindle inside the wall. The vanes pass through the wall of the rotor in two diametrically opposite openings. During the rotation, the rotor drives the vanes to rotation about the spindle. The spindle and a shaft for driving the rotor extend into the cavity from opposite sides. In this way the spindle does not interfere with the rotor, and the shaft does not interfere with the vanes, during the rotation.

WO9943926A1 describes a rotary-piston machine comprising a housing having a cavity, a rotor received in the housing, which rotor having a rotor axis and a peripheral surface, inlet and outlet passages in communication with said cavity, one or more vanes radially slidably received in slots in the rotor, each vane extending radially from the internal surface of the housing to the rotor axis, and at least one working chamber being part of the cavity and which is defined by the internal surface of the housing, the peripheral surface of the rotor and the side surface of at least one vane. Each vane is articulated connected about an axis to one end of a control arm and is in the other end pivotably journaled in a fixed axle shaft having a central axis being coincident with the axis extending centrally through the cavity of the housing, which axis extend in parallel with and spaced from the rotor axis, and the rotor proper constitute the unit for power take off or power input.

For all rotary sliding vane machines, the pressure varies from the inlet to the outlet. Consequently, there are varying differential pressures across the vanes, which causes varying tangential forces acting on the vanes. Normally, there is also a change of direction of the tangential forces during the rotation.

The tangential force acting on each vane creates a bending moment in the vane. The tangential force and the bending moment are absorbed by forces acting on the vane in the slot. Principally, these forces consist of one force at the outer end of the slot acting opposite the tangential force, and one force at the inner end of the slot acting in the same direction as the tangential force. The tangential force and the bending moment also tilt the vane in its slot, which reduces the sliding area to the area around the forces in the slot. Since the tangential force changes direction during the rotation, the vane is tilted back and forth in its slot. There are also dynamic forces caused by inertial forces, which act on the vane.

The forces in the slots increase friction during relative sliding between the vanes and the rotor in the slot, which may reduce sliding and increase wear of the vanes. One way of reducing the friction is to use slide bearings. The slide bearings can be either dry, solid-state lubricated, lubricated by a liquid lubricant or lubricated by the process fluid.

One way of lubricating the vanes in the slots would be to use hydrodynamic bearings, i.e. bearings with bearing pads in which a film of lubricant between the pad and the vane is built up by the movement of the vane. The continuous change of direction of the vane's movement would, however, prevent the build-up of a sufficiently thick film of lubricant, and hydrodynamic bearings are therefore not suited. Another way of lubricating would be to use conventional hydrostatic bearings, i.e. bearings with bearing pads in which a film of lubricant between the pad and the vane is built up by a continuous supply of pressurised lubricant. In order for this to work, however, in a rotating sliding vane machine for high performance, lubricant would need to have high pressure, and the supply of high pressure lubricant would require a high pressure pump and a transfer of high pressure lubricant to rotating parts of the machine, which would be both costly and complicated, particularly due to the need for rotating seals. In addition, the constant high pressure of the lubricant on both sides of the vane would cause high leakage of lubricant during the tilting of the vane, and also would not be favourable as it would create forces that would come in addition to the tangential forces due to the differential pressure across the vane.

Further, in many services, to not contaminate the process fluid, lubricants other than liquid process fluid may be undesirable. Examples include using the rotary sliding vane machine as a steam expander in electric power generation or as a compressor in a heat pump in an industrial process.

A purpose of the invention is to provide a rotary sliding vane machine with lubricated vanes in which there is no need for a supply of high pressure lubricant and a transfer of high pressure lubricant to rotating parts of the machine. Another purpose of the invention is to provide a rotary sliding vane machine with lubricated vanes in which the process fluid is not contaminated. A further purpose of the invention is to provide a rotary sliding vane machine with lubricated vanes in which the design is efficient and favourable with respect to assembly and maintenance. A still further purpose is that the invention at least shall provide an alternative to prior art.

Further features, advantages and purposes of the invention and how they are achieved will appear from the description, the drawings and the claims.

The invention thus relates to a rotary sliding vane machine for fluid processing, comprising:
- a housing with an internal wall forming a cavity with an inlet and outlet for process fluid;
- a rotor with a rotor axis in the cavity, a distance between an outer face of the rotor and the internal wall of the housing varies in the rotational direction;
- vanes arranged in outwardly directed slots in the rotor, there is relative sliding between the vanes and the rotor during rotation, the vanes extend between the outer face of the rotor and the internal wall of the housing.

According to the invention the rotary sliding vane machine comprises at least one pair of hydrostatic slide bearings for each vane, each pair comprises one hydrostatic slide bearing on each side of the vane, each hydrostatic slide bearing comprises:
- a bearing fluid chamber with a variable volume;
- a bearing fluid supply line with a flow restriction between a bearing fluid supply and the bearing fluid chamber;
- a bearing pad with a bearing face facing the vane, and an opposite side facing the bearing fluid chamber, the bearing pad is movable towards and away from the bearing fluid chamber, a movement of the bearing pad towards the bearing fluid chamber corresponds to a decrease of the bearing fluid chamber volume, a movement of the bearing pad away from the bearing fluid chamber corresponds to an increase of the bearing fluid chamber volume;
- a bearing fluid channel between the bearing fluid chamber and the bearing pad face, for supplying bearing fluid to a bearing fluid film between the bearing pad face and the vane.

During rotation, pressure changes of the process fluid cause varying tangential forces on the vane, which tilt the vane towards and away from the bearing pad. When the vane is tilted towards the bearing pad, the vane forces the bearing pad towards the bearing fluid chamber, which decreases the volume of the bearing fluid chamber, the flow restriction of the bearing fluid supply line restricts return of bearing fluid to the bearing fluid supply, causing a pressurising of the bearing fluid in the bearing fluid chamber, making it high pressure bearing fluid, and high pressure bearing fluid flows from the bearing fluid chamber, through the bearing fluid channel to the bearing pad face, and to the slide bearing fluid film.

Further, when the vane is tilted away from the bearing pad, bearing fluid at supply pressure flows from the bearing fluid supply line to the bearing fluid chamber, which increases the volume of the bearing fluid chamber, which in turn forces the bearing pad towards the vane, at the same time supply pressure bearing fluid flows from the bearing fluid chamber, through the bearing fluid channel to the bearing pad face, and to the slide bearing fluid film.

In one embodiment the variable volume of the bearing fluid chamber is achieved by a wall of the bearing fluid chamber being formed by a flexible membrane. The side of the bearing pad facing the bearing fluid chamber may abut the membrane, or be connected to the membrane. Alternatively, the membrane may take other shapes, e.g. have a ring-shaped flexible outer portion and a stiff centre portion, which may be connected to the bearing pad.

In another embodiment the bearing fluid chamber is formed by a cylinder with a bottom, and a plunger with a bottom received in the cylinder. The bearing fluid supply line is connected to an opening in the cylinder near or in its bottom, the bearing pad is connected to the plunger, and the bearing fluid channel extends between an opening in the plunger and the bearing pad face. In this embodiment, when the vane is tilted towards the bearing pad, the vane forces the bearing pad and the plunger towards the cylinder bottom, the flow restriction of the bearing fluid supply line restricts return of bearing fluid to the bearing fluid supply, the plunger pressurises the bearing fluid in the cylinder, making it high pressure bearing fluid, and high pressure bearing fluid flows from the cylinder, through the bearing fluid channel to the bearing pad face, and to the slide bearing fluid film. Further, when the vane is tilted away from the bearing pad, bearing fluid at supply pressure flows from the bearing fluid supply line to the cylinder, which forces the plunger and the bearing pad towards the vane, at the same time supply pressure bearing fluid flows from the cylinder, through the bearing fluid channel to the bearing pad face, and to the slide bearing fluid film.

The flow restriction of the bearing fluid supply line may be provided by the bearing fluid supply line itself, by adapting the diameter, length and shape of the bearing fluid supply line to the actual design of the hydrostatic slide bearing. Alternatively, or in addition, the flow restriction of the bearing fluid supply line may be provided by a distinct flow restrictor. This flow restrictor may be formed by a flow reducer, e.g. a constriction of the line, or a check valve, e.g. a reed valve.

The bearing fluid channel may also have a flow restriction. This may be provided by the bearing fluid channel itself, by adapting the diameter, length and shape of the bearing fluid channel to the actual design of the hydrostatic slide bearing. Alternatively, or in addition, the flow restriction of the bearing fluid channel may be provided by a distinct flow restrictor. This flow restrictor may be formed by a flow reducer, e.g. a constriction of the line, or a check valve, e.g. a reed valve.

The bearing pad face may be flat, and the bearing fluid channel may have its outlet in an opening in the flat face. Alternatively, the bearing pad face may have a recess, and the bearing fluid channel may have its outlet in an opening in the recess.

Apart from the design of the hydrostatic slide bearings, the rotary sliding vane machine according to the invention may have any design. The vanes may be radial or point obliquely outwards. Further the vanes may be forced towards the internal wall of the housing by the centrifugal force, hydraulically or mechanically. In some rotary sliding vane machines, the vanes will also be pivoted during the rotation. In this kind of machines, the hydrostatic slide bearings of the rotary sliding vane machine according to the invention may form part of a bearing apparatus also comprising a pivot bearing for the vane.

The number of vanes depends on the actual design, and is typically between 2 and 10.

Embodiments of the invention will now be described for a rotary sliding vane machine with a particular design, with reference to the accompanying drawings, in which.

Figure 1:
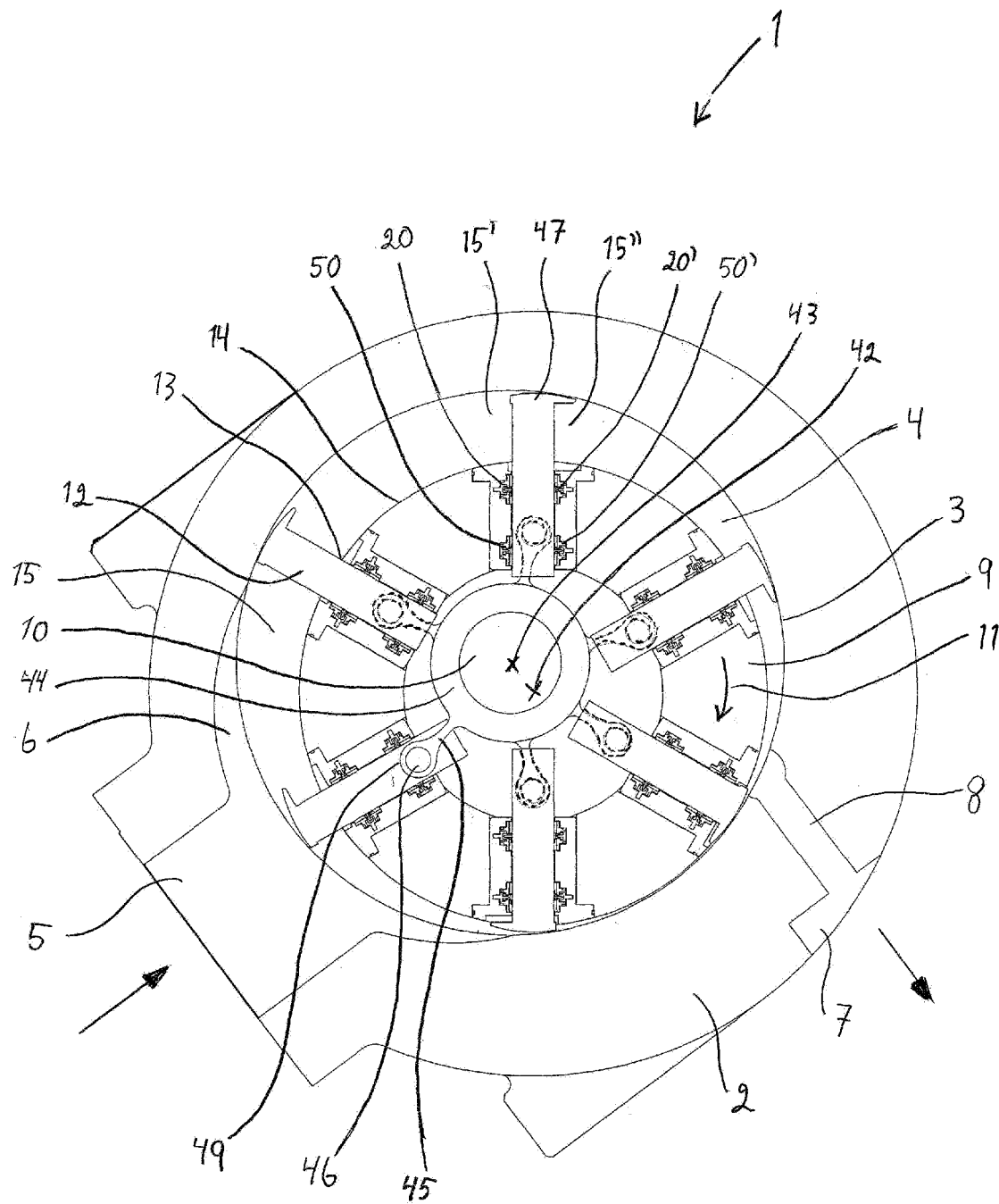
FIG. 1 is a cross sectional view of a rotary sliding vane machine according to the invention.
Figure 3A:
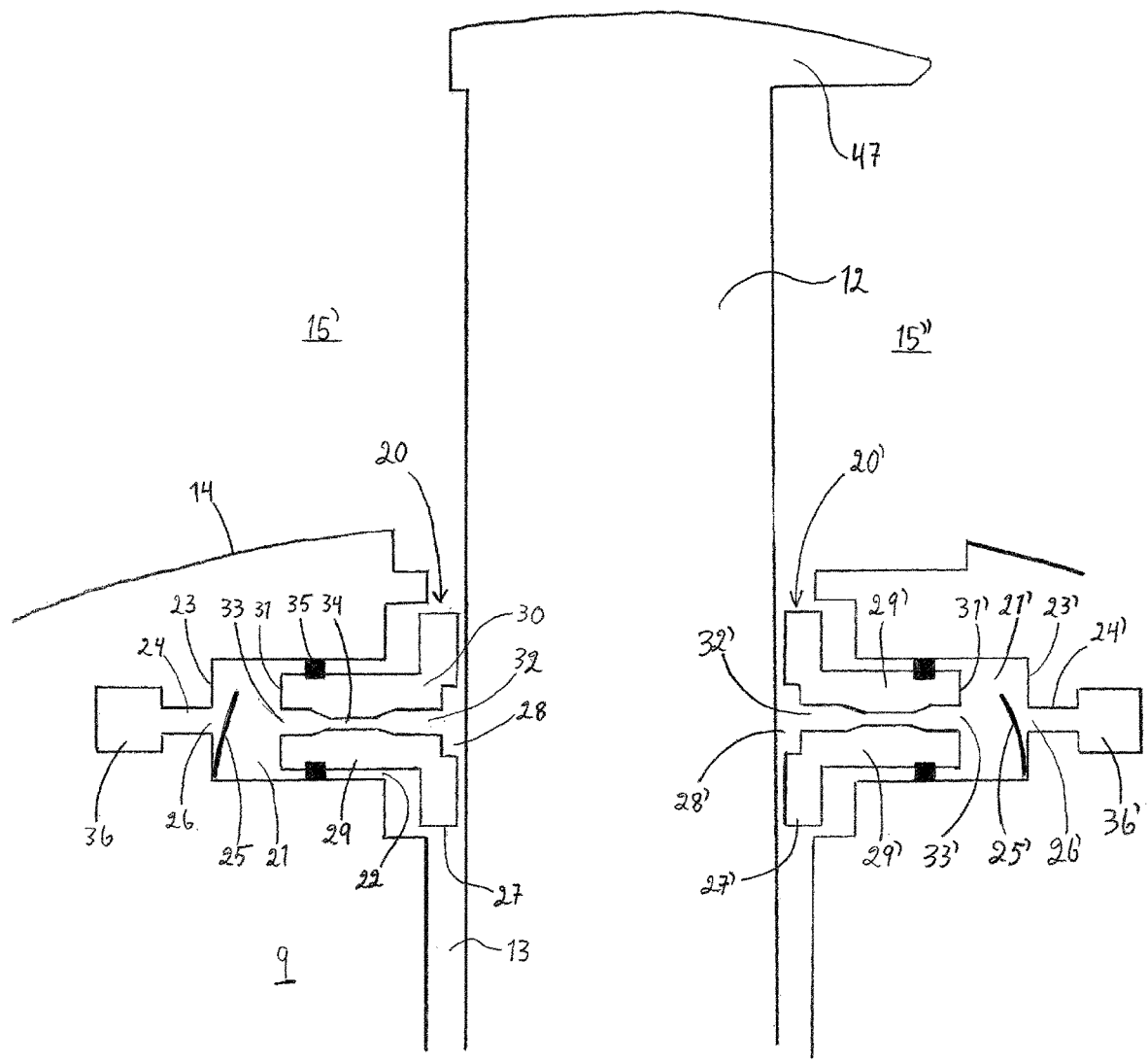
Figure 4A:
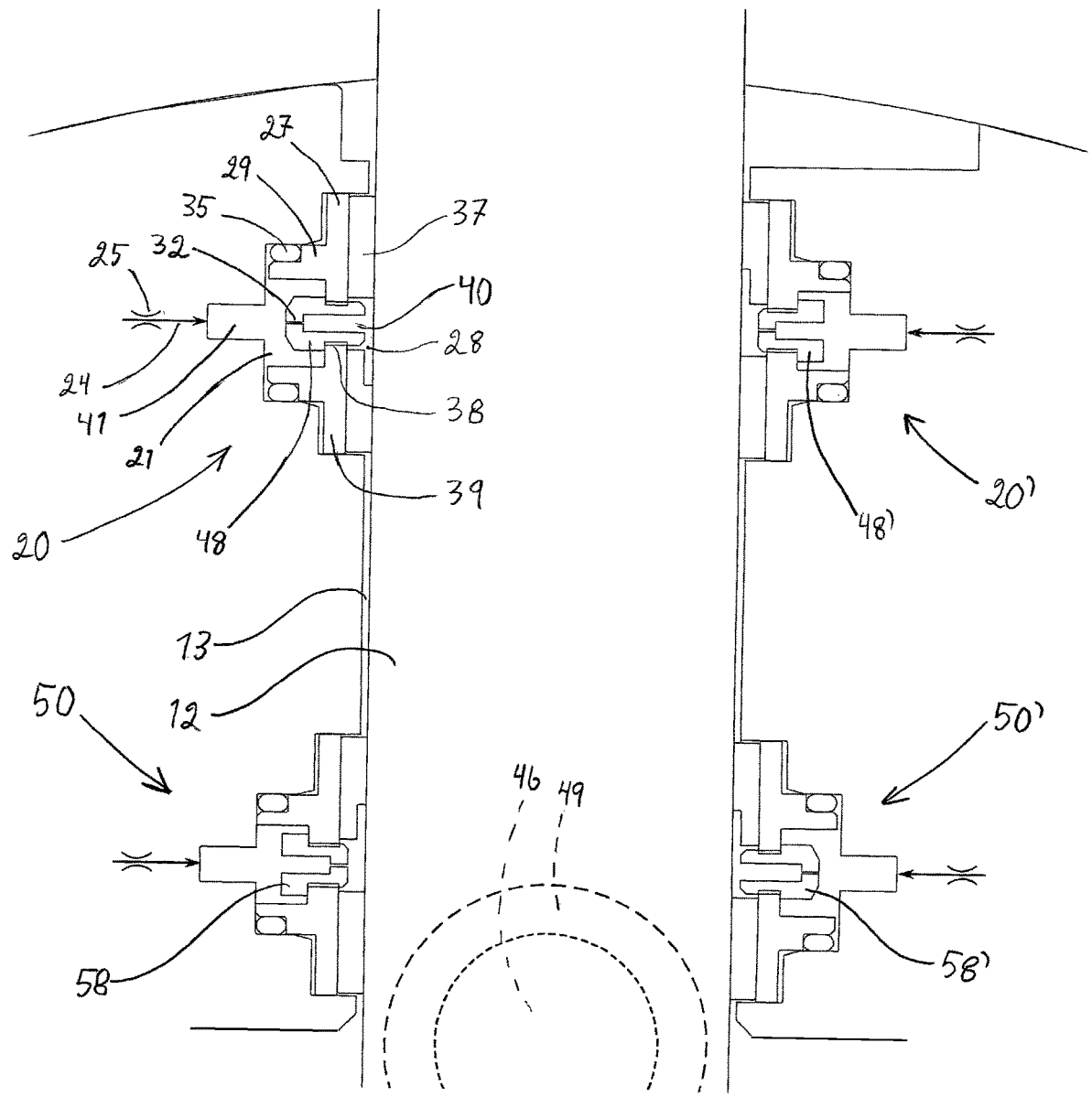
Figure 4B:
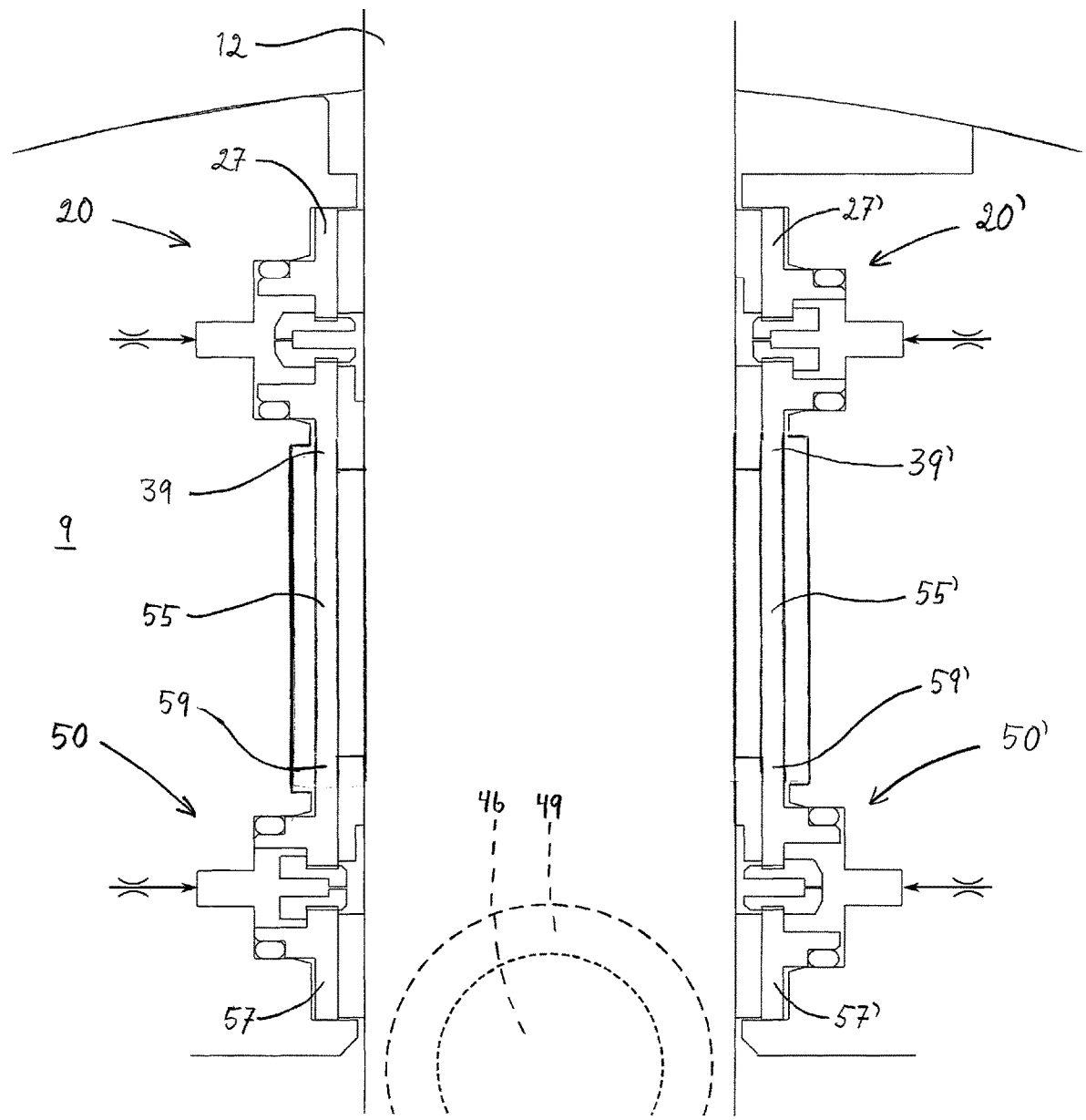
Figure 5:
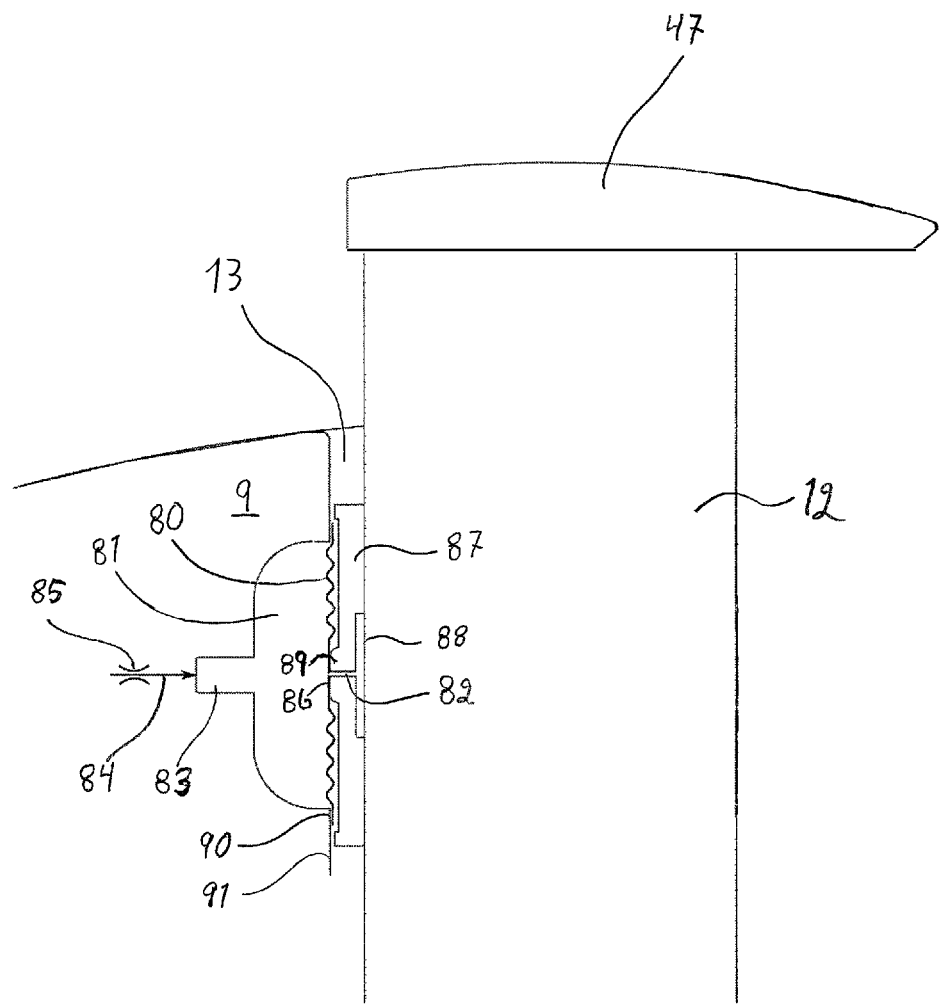
Figure 6:
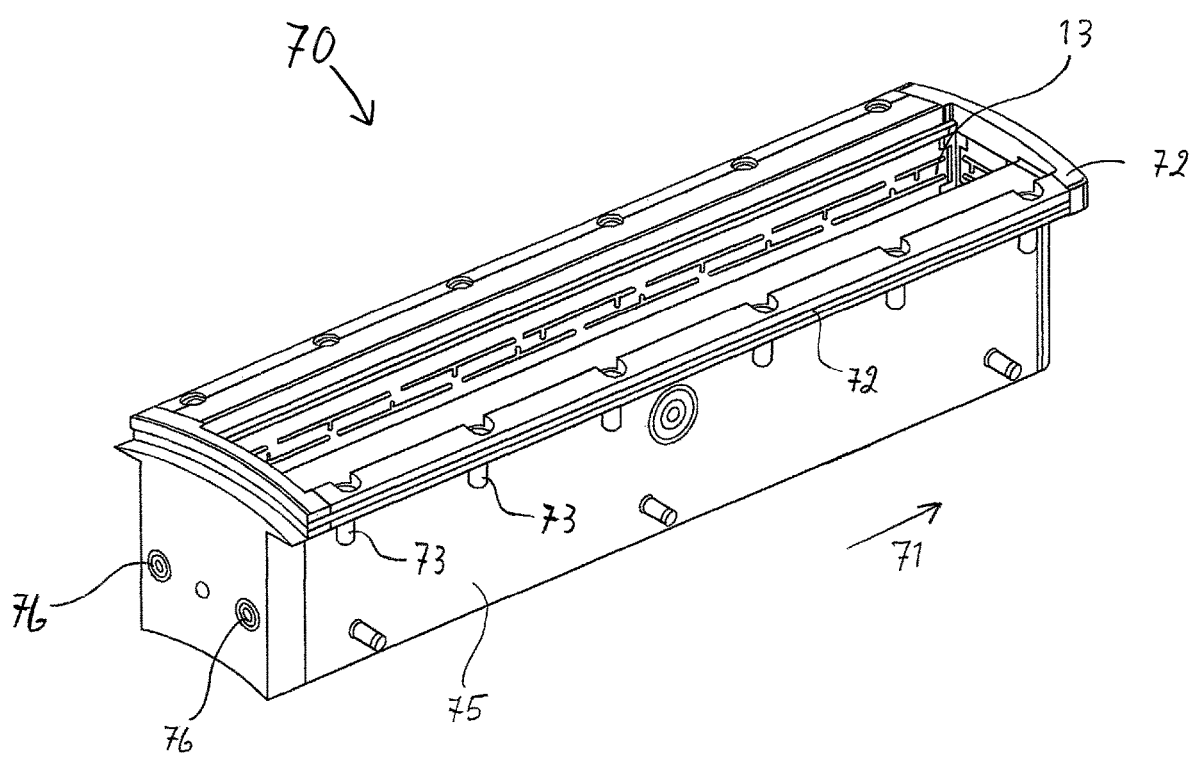

FIG. 3a, b is a cross sectional view illustrating hydrostatic slide bearings of a rotary sliding vane machine according to the invention;

FIG. 4a is a cross sectional view illustrating the hydrostatic slide bearings of FIG. 1 in more detail;

FIG. 4b is a cross sectional view illustrating a variation of the hydrostatic slide bearings of FIG. 4a;

FIG. 5 is a cross sectional view illustrating a hydrostatic slide bearing of a rotary sliding vane machine according to the invention; and FIG. 6 is a perspective view of a cassette with hydrostatic slide bearings according to the invention.

FIG. 1 is a cross sectional view of a rotary sliding vane machine 1 according to the invention, seen in axial direction. A housing 2 has an internal wall 3 that forms a cylindrical cavity 4 with a cavity axis 43. An inlet channel 6 extends from an inlet 5 for process fluid to cavity 4, and an outlet channel 8 extends from cavity 4 to an outlet 7 for process fluid. A stationary spindle 10 is centrally located in cavity 4. Six centre arms comprising ring portions 44 around spindle 10 and rod portions 45 extending radially outwards from ring portions 44 are independently rotatable about spindle 10. The foremost centre arm 44, 45 is shown in full lines, while the ring portions of the other centre arms are hidden behind the ring portion of the foremost centre arm. Most of the rod portions of the other centre arms are shown in dashed lines.

A cylindrical rotor 9 is connected to a not illustrated journaled shaft, and rotates eccentric in cavity 4 about a rotor axis 42 in direction 11. Vanes 12 are by means of hydrostatic slide bearings 20 slidably arranged in radial slots 13 in rotor 9. An inner portion of each vane 12 is pivotably connected to a vane ring 49 of rod portion 45 of the centre arm via a pivot 46, which means that the vanes 12 are kept at constant distance from spindle 10 and cavity axis 43, and also that each vane 12 is independently rotatable about axis 43. The hydrostatic bearings 20 keep vanes 12 in place in slots 13 and ensure that vanes 12 point outwards. The centrifugal force also contributes to forcing vanes 12 outwards. The vanes 12 extend to internal wall 3 of housing 2, and sealing heads 47 seal between vanes 12 and wall 3. During rotation of rotor 9, vanes 12 pivot about pivot 46 and slide in the hydrostatic bearings 20 to adapt to the various relative positions between rotor 9 and cavity 4 due to the eccentricity of rotor 9.

Since rotor 9 is eccentrically mounted in cavity 4, a distance between an outer face 14 of rotor 9 and internal wall 3 of housing 2 varies in rotational direction 11. Spaces 15 are formed between vanes 12, wall 3 and the rotor outer face 14, and since the distance between face 14 and wall 3 varies in rotational direction 11, the volumes of spaces 15 also vary in rotational direction 11. During use of the rotary sliding vane machine, spaces 15 are filled with process fluid. The varying volumes of spaces 15 ensure that the net flow of process fluid is from inlet 5 to outlet 7. At inlet 5, spaces 15 have inlet pressure, while at outlet 7, spaces 15 have outlet pressure. The pressures of spaces 15 therefore vary around rotor 9.

Figure 2:
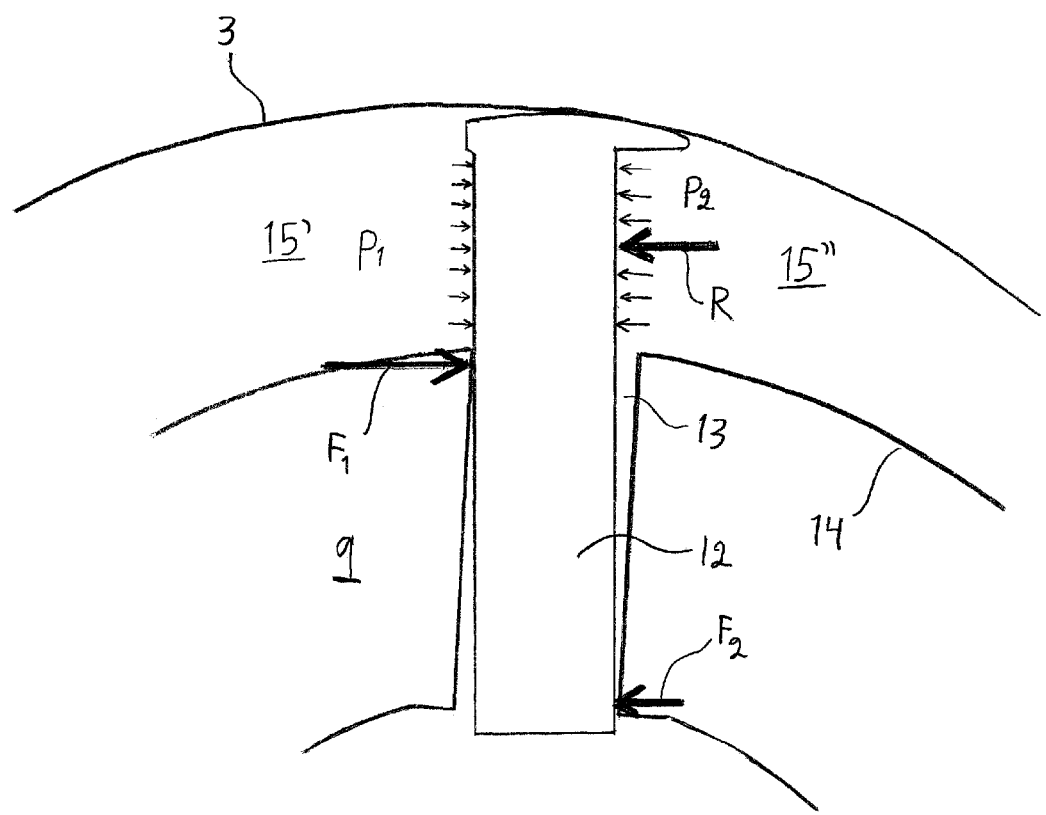
FIG. 2 is a cross sectional view illustrating the forces attacking a vane in a rotary sliding vane machine.

FIG. 2 is a simplified cross sectional view illustrating forces attacking the top vane in the rotary sliding vane machine of FIG. 1, and which also applies to prior art rotary sliding vane machines with vanes pointing outwards from the rotor. A vane 12 is located in a slot 13, seen in axial direction. Since the purpose of FIG. 2 is to illustrate the forces attacking vane 12, the slide bearings illustrated in FIG. 1 are omitted from FIG. 2. The gap between vane 12 and the wall of slot 13 is exaggerated for illustrative purposes. A space 15' on one side of vane 12 has pressure $p_1$, and a space 15" on the other side of vane 12 has pressure $p_2$, which is higher than pressure $p_1$. Thus, there is a differential pressure across vane 12. The forces of the differential pressure can be represented by a tangential resultant force R with a magnitude equal to the product of the differential pressure and the area of the vane exposed to the differential pressure.

Tangential force R tilts vane 12, as illustrated. Tangential force R also creates a bending moment, which slightly bends vane 12. R and the bending moment are absorbed in slot 13 by a reaction force F1 at the top of slot 13, and a smaller reaction force F2 at the inner end of slot 13. F1 is directed opposite R, while F2 is directed in the same direction as R. Due to equilibrium:

$$F1=F2+R$$

Since the pressures in spaces 15', 15" vary during rotation, the differential pressure across vane 12 also varies during rotation. Further, since the distance between rotor outer face 14 and housing internal wall 3 varies during rotation, the area of vane 12 exposed to the differential pressure also varies. The tangential force R therefore varies during rotation. Normally the differential pressure changes direction during the rotation, and the tangential force R therefore also changes direction. When tangential force R varies and changes direction, forces F1 and F2 in slot 13 also vary and change direction, and vane 12 tilts in the opposite direction. Vane 12 thus tilts back and forth during rotation. In addition to the forces due to the differential pressure, there are also dynamic forces caused by vibrations, centripetal acceleration, Coriolis forces and other inertial forces, which contribute to the forces in slots 13 and the tilting of vanes 12. The forces in the slots increase friction between vanes 12 and rotor 9 during their relative sliding, and this increased friction may reduce the sliding and increase wear of the vanes.

FIG. 3a, b is a cross sectional view illustrating a pair of hydrostatic slide bearings of a rotary sliding vane machine according to the invention. The hydrostatic slide bearings of FIG. 3a, b slightly differ from the hydrostatic slide bearings of FIG. 1. As discussed with reference to FIG. 2, vane 12 tilts back and forth in slot 13 during the rotation. The gap between vane 12 and the wall of slot 13, the tilting of vane 12 and the travel of the bearing pads are exaggerated for illustrative purposes.

FIG. 3a illustrates vane 12 centrally located in slot 13 in rotor 9 with an outer face 14, seen in axial direction. One hydrostatic bearing 20, 20' is located on each side of vane 12. Hydrostatic bearing 20 comprises a cylinder 21 transversely arranged relative to slot 13. Cylinder 21 can be arranged in rotor 9 itself, or in a body which is located in rotor 9. Cylinder 21 has an open top 22 and a bottom 23. A bearing fluid supply line 24 extends between a bearing fluid feed line 36 and an opening 26 in the cylinder bottom 23. A bearing pad 27 with a recess 28 face vane 12. A plunger 29 has a bottom 31 and a top 30 integral with bearing pad 27. Alternatively, plunger 29 and bearing pad 27 could have been separate items, and mechanically connected, e.g. via threading. Plunger 29 is received in cylinder 21, and an O-ring 35 seals between plunger 29 and cylinder 21. Plunger 29 has a bearing fluid channel 32 extending between an opening 33 in the plunger bottom and bearing pad recess 28. Bearing fluid channel 32 has a restrictor 34 formed by a constriction. Depending of the actual design, restrictor 34 may have other shapes or designs, or can be dispensed with.

A reed valve 25 covers an opening 26 in cylinder bottom 23 and prevents bearing fluid from flowing from cylinder 21 to bearing fluid supply line 24. Reed valve 25 is one kind of check valve that can be used as a bearing fluid supply restrictor. Alternatively, the check valve could have been included in bearing fluid supply line 24. Bearing fluid supply line 24 may be formed by a channel, bore or tube.

Bearing fluid feed line 36 extends in axial direction of rotor 9, and is part of a branched network of channels, bores or tubes that feed bearing fluid to the hydrostatic bearings. Bearing fluid is fed from a stationary supply, and transferred to the rotor during rotation, via stationary and rotating parts and seals between them.

During operation of the rotary sliding vane machine, bearing fluid at supply pressure is supplied from bearing fluid feed line 36, through bearing fluid supply line 24, into the portion of cylinder 21 defined by plunger bottom 31, further through bearing fluid channel 32 and into recess 28. From recess 28, the bearing fluid is distributed between the surface of bearing pad 27 and vane 12, in which the fluid forms a bearing fluid film. At the edges of bearing pad 27, bearing fluid leaks from the bearing fluid film into slot 13, and finally ends up in space 15' in the cavity, where it mixes with the process fluid.

Figure 3B:
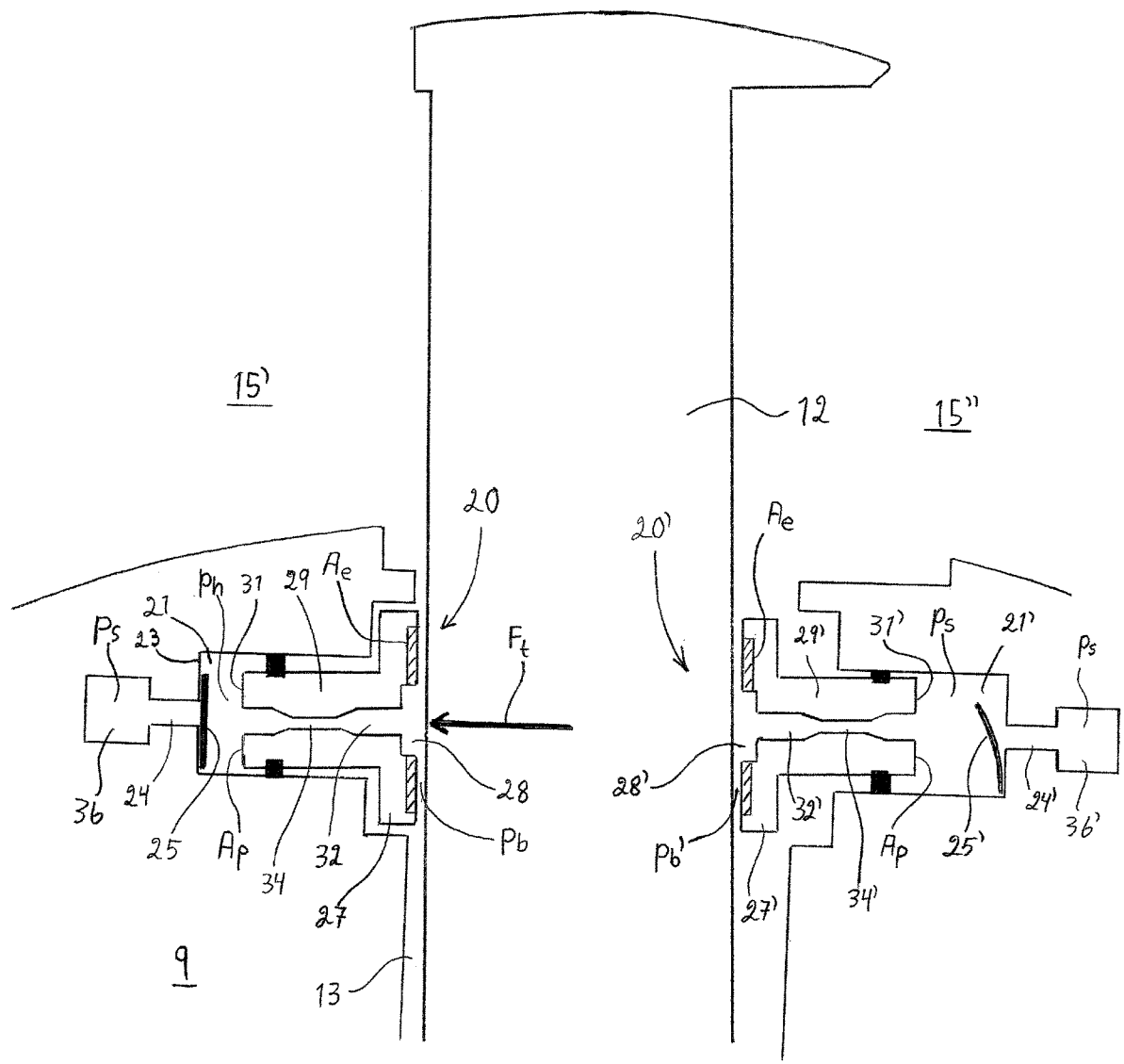

Hydrostatic bearing 20' is identical to hydrostatic bearing 20 and functions in the same way. Corresponding elements are designated by the same reference numerals primed. FIG. 3b shows the hydrostatic bearings 20, 20' of FIG. 3a when vane 12 is tilted towards bearing 20, i.e. towards bearing pad 27. This increases the pressure in the bearing fluid film between bearing pad 27 and vane 12. The increased pressure in the bearing fluid film pushes bearing pad 27 towards cylinder 21, and plunger 29 into cylinder 21, which pressurises the bearing fluid in cylinder 21 to high pressure bearing fluid $p_h$. The high pressure closes reed valve 25, and there is no flow of bearing fluid to or from cylinder 21 through bearing fluid supply line 24. The high pressure in cylinder 21 also causes bearing fluid to flow through bearing fluid channel 32 to recess 28, where it replenishes the bearing fluid film. This removes fluid from cylinder 21 and reduces the pressure in cylinder 21, and consequently the bearing fluid film pushes bearing pad 27 further towards cylinder 21, and plunger 29 further into cylinder 21. This continues until vane 12 is tilted the other way.

Simultaneously vane 12 is tilted away from hydrostatic bearing 20', i.e. away from bearing pad 27'. The pressure in the bearing fluid film between bearing pad 27' and vane 12 is therefore reduced. The pressure in cylinder 21' is the bearing fluid supply pressure $p_s$. Since the pressure in the bearing fluid film between bearing pad 27' and vane 12 is reduced, the supply pressure $p_s$ is high enough to push plunger 29' and bearing pad 27' outwards towards vane 12. At the same time bearing fluid flows from cylinder 21', through bearing fluid channel 32' and into recess 28', where it replenishes the bearing fluid film. This reduces the pressure in cylinder 21', and consequently more bearing fluid at supply pressure $p_s$ enters cylinder 21' from bearing fluid supply line 24'. This forces plunger 29' and bearing pad 27' further towards vane 12 and supplies more bearing fluid to the bearing fluid film. This continues until vane 12 is tilted the other way.

A constriction or other flow reducer could have been used as restrictor 25 instead of a reed valve. If so, the high pressure $p_h$ built up in cylinder 21 by plunger 29 would gradually be relieved due to a small return flow of bearing fluid from cylinder 21 into bearing fluid supply line 24. However, vane 12 is tilted back and forth at high frequency, and therefore the flow direction would have changed before any significant amount of bearing fluid had returned to bearing fluid supply line 24.

When vane 12 forces bearing pad 27, 27' of one of the hydrostatic bearings 20, 20' towards cylinder 21, 21', the bearing pad of the other hydrostatic bearing moves towards vane 12, and vice versa. In this way the pair of hydrostatic bearings 20, 20' adapts the position of their bearing pads 27, 27' to the position of vane 12, and at the same time maintain a bearing fluid film that allows the sliding of vane 12. A particular advantage is that bearing pads 27, 27' adapt their positions to production deviations and thermal deformations of the items forming the hydrostatic bearings, the vane and the slot.

Generally, the force acting between a surface and a fluid is equal to the product of the pressure in the fluid and the area of the surface. However, for a hydrostatic bearing pad, the bearing fluid film pressure varies over the area, and is lowest at the edges of the bearing pad. To simplify the calculation of the force, a constant pressure in the bearing fluid film and an effective area of the bearing pad is assumed.

The forces acting in the hydrostatic bearings 20, 20' will now be discussed with reference to FIG. 3b.

For bearing 20, the force acting between the bearing fluid film and vane 12, and also between the bearing fluid film and bearing pad 27, is $$p_b \times A_e$$

wherein $p_b$ is bearing fluid film pressure between vane 12 and bearing pad 27, and $A_e$ is effective area of bearing pad 27, shaded in FIG. 3b.

For bearing 20', the force acting between the bearing fluid film and vane 12, and also between the bearing fluid film and bearing pad 27', is $$p_b \times A_e$$

wherein $p_b$ is bearing fluid film pressure between vane 12 and bearing pad 27', and $A_e$ is effective area of bearing pad 27', shaded in FIG. 3b, same size as for bearing pad 27.

When vane 12 is tilted towards bearing pad 27, as in FIG. 3b, a tangential force $F_t$ equal the opposite of reaction force F1 in FIG. 2 acts on the bearing fluid film of bearing 20 from vane 12. The force on vane 12 from the bearing fluid film of bearing 20' adds to this force. The total force from vane 12 acting on the bearing fluid film of bearing 20 is therefore:

$$F_t + (p_b \times A_e)$$

This force is equal to the force from bearing pad 27 acting on the bearing fluid film of bearing 20, i.e.

$$F_t + (p_b \times A_e) = p_b \times A_e$$

It is seen that the bearing fluid film pressure $p_{b'}$ of bearing 20' adds to the loading of hydrostatic bearing 20 and increases the requirement to the bearing fluid film pressure $p_b$ of bearing 20. However, the bearing fluid film pressure varies during the operation. When vane 12 is tilted towards bearing 20, and bearing fluid pressure $p_b$ is increased, vane 12 is simultaneously tilted away from bearing 20', and bearing fluid pressure $p_{b'}$ is reduced. The reduction of bearing fluid film pressure $p_b$ of bearing 20' reduces the required pressure $p_b$ of bearing 20. This is a great advantage, since it reduces the load on the bearings and reduces the required size of the bearings for a given size of the rotary sliding vane machine. Further, this reduction of the bearing fluid film pressure in the bearing which the vane has been tilted away from, also reduces the leakage of bearing fluid from this bearing. This also means that the hydrostatic bearings according to the invention enable an adaption to an asymmetric load-cycle or a variable load on the rotary sliding vane machine during operation.

During operation, the direction of the tangential force $F_t$ is changing at a high frequency, and the bearing pads and the plungers moves back and forth at the same high frequency. Every time the bearing pads and the plungers change their speed and movement direction, they are accelerated. This acceleration complicates the calculation of the forces of the hydrostatic bearings. However, at some places during the movement the acceleration is zero, and then the force acting on the bearing pad from the bearing fluid film is equal to the force acting on the plunger from the bearing fluid in the cylinder.

Then, when vane 12 is tilted towards bearing pad 27, the following applies:

$$p_b \times A_e = p_h \times A_p$$

wherein $p_b$ and $A_e$ are defined above, $p_h$ is high pressure in cylinder 21 due to pressurizing from plunger 29, $A_p$ is area of plunger bottom 31, 31'.

At the same time, vane 12 is tilted away from bearing pad 27', and the following applies:

$$p_{b'} \times A_e = p_s \times A_p$$

wherein $p_{b'}$, $A_e$ and $A_p$ are defined above, $p_s$ is supply pressure in cylinder 21' from bearing fluid supply line 24'.

Further, for bearing fluid to flow from cylinder 21 to the bearing fluid film of bearing 20 when vane 12 is tilted towards bearing 20, the following must apply:

$$p_b < p_h$$

And, for bearing fluid to flow from cylinder 21' to the bearing fluid film of bearing 20' when vane 12 is tilted away from bearing 20', the following must apply:

$$p_{b'} < p_s$$

It has been found, that to ensure a good function of the bearings, preferably:

$$A_p < A_e$$

$A_e$ is typically 60-80% of the area of the bearing pad.

Typically, the rotational speed is 500-3600 rpm. The process fluid pressure is typically 1-16 bar. The bearing fluid supply pressure $p_s$ must be higher than the process fluid pressure, and is typically 10-40 bar. Typically, the bearing fluid high pressure $p_h$ is 10-100 bar.

The hydrostatic bearing according to the invention provides the high pressure bearing fluid it needs itself. Thus, bearing fluid can be supplied to the rotor via rotary seals at a moderate supply pressure, which is technically much simpler than supplying the bearing fluid at high pressure.

FIG. 4a is a cross sectional view that illustrates the top vane 12 of FIG. 1 and its hydrostatic slide bearings in more detail. It is seen that there is a pair of outer hydrostatic bearings 20, 20' located near the top of slot 13 and a pair of inner hydrostatic bearings 50, 50' located near the inner end of slot 13. With reference to FIG. 2, the outer hydrostatic bearings 20, 20' provide the reaction force F1, and the inner hydrostatic bearings 50, 50' provide the reaction force F2.

The hydrostatic slide bearing of FIG. 4a functions similarly to the hydrostatic slide bearings of FIG. 3a, 3b, but there are some differences. The bearing pad 27 of hydrostatic bearing 20 of FIG. 4a comprises a face 37 of bearing metal and a bearing pad basis 39 which is integral with plunger 29. Cylinder 21 has an extension 41, and bearing fluid supply line 24 is connected to this extension. There is no reed valve in cylinder 21, instead there is a restrictor 25 in bearing fluid supply line 24.

An exchangeable insert 48 is screwed into bearing pad basis 39 in a threaded connection 38 in the centre of the bearing pad 27, within plunger 29. Insert 48 has a bearing fluid channel 32 which connects cylinder 21 with bearing pad recess 28. Insert 48 also has an internal screw drive 40 that matches a suitable key, e.g. a hex key, to enable insertion and removal. Inserts 48 can be made in different ways, with bearing fluid channels 32 with different flow restrictions, for adaption to different operating conditions. It is seen that the outer hydrostatic bearings 20, 20' have different inserts 48, 48', and that the inner hydrostatic bearings 50, 50' also have different inserts 58, 58'. This is an adaption to different forces of the different hydrostatic bearings.

FIG. 4b is a cross sectional view illustrating a variation of the hydrostatic slide bearings of FIG. 4a. In FIG. 4b the bearing pad basis 39 of outer hydrostatic bearing 20 is connected to a bearing pad basis 59 of inner hydrostatic bearing 50 by a connection bar 55 on one side of vane 12, and bearing pad basis 39' of outer hydrostatic bearing 20' is connected to a bearing pad basis 59' of inner hydrostatic bearing 50' by a connection bar 55' on the other side of vane 12. FIG. 4b shows the bearing pad bases 39, 59 and the connection bar 55 in one piece, and the bearing pad bases 39', 59' and the connection bar 55' in one piece. Alternatively, the bearing pad bases may be mechanically connected to the connection bars, e.g. by bolting.

FIG. 5 is a cross sectional view illustrating a different embodiment of a hydrostatic slide bearing of a rotary sliding vane machine according to the invention. Like the hydrostatic slide bearings discussed above, there is a pair of hydrostatic slide bearings comprising one hydrostatic slide bearing on each side of vane 12. Only one hydrostatic slide bearing is, however, illustrated in FIG. 5.

The hydrostatic slide bearing of FIG. 5 comprises a bearing fluid chamber 81 formed in rotor 9. Bearing fluid chamber 81 has a variable volume, which is achieved by one of its walls being formed by a flexible membrane 80. Membrane 80 is circular with circular corrugations, made from steel. A rim 90 of membrane 80 is attached to a face 91 of rotor 9, e.g. by welding.

A bearing fluid supply line 84 with a flow restrictor 85 is connected to an extension 83 of bearing fluid chamber 81. A movable bearing pad 87 with a recess 88 face vane, and an opposite side of bearing pad 87 face bearing fluid chamber 81. The side of bearing pad 87 facing bearing fluid chamber 81 has a boss 89 which abuts a centre portion 86 of membrane 80. In the illustrated embodiment boss 89 is also connected to centre portion 86. This connection can be made by welding or bolting.

A bearing fluid channel 82 with a restriction to the flow of bearing fluid extends from bearing fluid chamber 81, through centre portion 86 of membrane 80, through bearing pad 87 and to bearing pad recess 88, for supplying bearing fluid to a bearing fluid film between bearing pad 87 and vane 12.

When vane 12 is tilted towards bearing pad 87, the pressure of the bearing fluid film between bearing pad 87 and vane 12 is increased, and bearing pad 87 is forced towards bearing fluid chamber 81. Membrane 80 flexes inwards and compresses bearing fluid chamber 81. Flow restrictor 85 of bearing fluid supply line 84 restricts return of bearing fluid to bearing fluid supply line 84, causing a pressurising of the bearing fluid in bearing fluid chamber 81, making it high pressure bearing fluid. High pressure bearing fluid then flows from bearing fluid chamber 81, through bearing fluid channel 82 to bearing pad recess 88, and to the bearing fluid film between bearing pad 87 and vane 12.

When vane 12 is tilted away from bearing pad 87, the pressure of the bearing fluid film between bearing pad 87 and vane 12 is reduced. The pressure of bearing fluid chamber 81 then expands bearing fluid chamber 81 by flexing membrane 80 outwards, and forces bearing pad 87 towards vane 12. This reduces the pressure of bearing fluid chamber 81, and bearing fluid at supply pressure flows from bearing fluid supply line 84 to bearing fluid chamber 81. This increases the pressure of bearing fluid chamber 81, which in turn forces bearing pad 87 further towards vane 12. At the same time supply pressure bearing fluid flows from bearing fluid chamber 81, through bearing fluid channel 82 to bearing pad recess 88, and to the bearing fluid film between bearing pad 87 and vane 12.

The bearing fluid may be oil based. However, in order not to pollute the process fluid, the bearing fluid may be a fluid which is not harmful to the process fluid. In one alternative, the bearing fluid is process fluid or derived from the process fluid. One example is when the rotary sliding vane machine is used as a steam expander. The bearing fluid may then be water. If the process fluid is a gas or 2-phase, which may be the case in e.g. a steam expander, the process fluid may be liquefied before it is used as bearing fluid. The bearing fluid may be derived from the process fluid upstream or downstream the rotary sliding vane machine. In this way supply pressure may be provided without the need for a pump. Alternatively, the process fluid may be pressurised to supply pressure by a pump.

When an oil-free lubricant, e.g. water, is used, it may be required with a higher bearing fluid film pressure than if an oil based lubricant were used. The invention provides a high pressure bearing fluid film without the need for a high pressure supply, and the invention is therefore favourable when using oil-free lubricant.

The axial extent of the rotary sliding vane machine depends on the actual design. In one embodiment, for each vane, two or more pairs of hydrostatic slide bearings are arranged in axial direction of the rotary sliding vane machine. Thus, on each side of the vane, there may be two, three or more outer hydrostatic bearings, and the same configuration of inner hydrostatic bearings. In this way a bearing arrangement that covers the extent of the vane in axial direction can be provided.

In one embodiment, more than one bearing fluid chamber is connected to or integral with the bearing pad. As an example, the same bearing pad may extend throughout the axial length of the vane, and the bearing pad may be connected to two plungers with corresponding cylinders, the cylinders are located at the same radius but at different axial positions.

FIG. 6 illustrates an embodiment in which the hydrostatic bearings according to the invention are included in a cassette 70. Cassette 70 includes a body 75 which contain the hydrostatic bearings for the vane, and a head 72 which forms the top of cassette 70 and serves to hold it in place in rotor 9. Arrow 71 defines the longitudinal direction of cassette 70, which is parallel to rotor axis 42. Bolts 73 for fastening head 72 to rotor 9 is seen along the edge of head 72. Slot 13 for vane 12 extends in the longitudinal direction of cassette 70. Connections 76 for bearing fluid feed line (36, FIG. 3a, b) is seen in the end of the cassette.

Cassettes 70 are inserted in the rotor 9 during the assembly of the rotor, and thus facilitates mounting of the hydrostatic bearings. The cassettes 70 are exchangeable, and thereby enables a favourable way of maintaining the hydrostatic bearings and the vanes. The vanes may be inserted in the slots after the cassettes have been mounted in the rotor. Alternatively, each cassette includes its vane, i.e. the vane forms part of the cassette.

The invention claimed is:

1. A rotary sliding vane machine for fluid processing, comprising:
   a housing with an internal wall forming a cavity with an inlet and outlet for process fluid;
   a rotor with a rotor axis in the cavity, a distance between an outer face of the rotor and the internal wall of the housing varies in the rotational direction;
   vanes arranged in outwardly directed slots in the rotor, there is relative sliding between the vanes and the rotor during rotation, the vanes extend between the outer face of the rotor and the internal wall of the housing;
   wherein at least one pair of hydrostatic slide bearings for each vane, each pair comprises one hydrostatic slide bearing on each side of the vane, each hydrostatic slide bearing comprises:
   a bearing fluid chamber with a variable volume;
   a bearing fluid supply line with a flow restriction between a bearing fluid supply and the bearing fluid chamber;
   a bearing pad with a bearing face facing the vane, and an opposite side facing the bearing fluid chamber, the bearing pad is movable towards and away from the bearing fluid chamber, a movement of the bearing pad towards the bearing fluid chamber corresponds to a decrease of the bearing fluid chamber volume, a movement of the bearing pad away from the bearing fluid chamber corresponds to an increase of the bearing fluid chamber volume;
   a bearing fluid channel between the bearing fluid chamber and the bearing pad face, for supplying bearing fluid to a slide bearing fluid film between the bearing pad face and the vane; wherein, during rotation:
   pressure changes of the process fluid cause varying tangential forces on the vane, which tilt the vane towards and away from the bearing pad;
   when the vane is tilted towards the bearing pad, the vane forces the bearing pad towards the bearing fluid chamber, which decreases the volume of the bearing fluid chamber, the flow restriction of the bearing fluid supply line restricts return of bearing fluid to the bearing fluid supply, causing a pressurizing of the bearing fluid in the bearing fluid chamber, making it high pressure bearing fluid, and high pressure bearing fluid flows from the bearing fluid chamber, through the bearing fluid channel to the bearing pad face, and to the slide bearing fluid film; and
   when the vane is tilted away from the bearing pad, bearing fluid at supply pressure flows from the bearing fluid supply line to the bearing fluid chamber, which increases the volume of the bearing fluid chamber, which in turn forces the bearing pad towards the vane, at the same time supply pressure bearing fluid flows from the bearing fluid chamber, through the bearing fluid channel to the bearing pad face, and to the slide bearing fluid film.

2. The rotary sliding vane machine of claim 1, wherein a wall of the bearing fluid chamber is formed by a flexible membrane.

3. The rotary sliding vane machine of claim 2, wherein the side of the bearing pad facing the bearing fluid chamber abuts the membrane.

4. The rotary sliding vane machine of claim 2, wherein the side of the bearing pad facing the bearing fluid chamber is connected to the membrane.

5. The rotary sliding vane machine of claim 1, wherein
the bearing fluid chamber is formed by a cylinder with a bottom, and a plunger with a bottom received in the cylinder;
the bearing fluid supply line is connected to an opening in the cylinder near or in its bottom;
the bearing pad is connected to the plunger;
the bearing fluid channel extends between an opening in the plunger and the bearing pad face;
wherein, during the rotation:
when the vane is tilted towards the bearing pad, the vane forces the bearing pad and the plunger towards the cylinder bottom, the flow restriction of the bearing fluid supply line restricts return of bearing fluid to the bearing fluid supply, the plunger pressurises the bearing fluid in the cylinder, making it high pressure bearing fluid, and high pressure bearing fluid flows from the cylinder, through the bearing fluid channel to the bearing pad face, and to the slide bearing fluid film; and
when the vane is tilted away from the bearing pad, bearing fluid at supply pressure flows from the bearing fluid supply line to the cylinder, which forces the plunger and the bearing pad towards the vane, at the same time supply pressure bearing fluid flows from the cylinder, through the bearing fluid channel to the bearing pad face, and to the slide bearing fluid film.

6. The rotary sliding vane machine of claim 5, wherein the area of the plunger bottom is smaller than an effective area of the bearing pad.

7. The rotary sliding vane machine of claim 1, wherein the flow restriction of the bearing fluid supply line at least in part is provided by a distinct flow restrictor.

8. The rotary sliding vane machine of claim 1, wherein the bearing fluid channel has a flow restriction.

9. The rotary sliding vane machine of claim 8, wherein the flow restriction of the bearing fluid channel at least in part is provided by a distinct flow restrictor.

10. The rotary sliding vane machine of claim 1, comprising, for each vane, a pair of outer hydrostatic slide bearings and a pair of inner hydrostatic slide bearings.

11. The rotary sliding vane machine of claim 10, wherein, on each side of the vane, the bearing pads of the outer and inner hydrostatic slide bearings are interconnected.

12. The rotary sliding vane machine of claim 1, wherein the hydrostatic slide bearings for each vane are included in an exchangeable cassette.

* * * * *